(No Model.) 2 Sheets—Sheet 1.

M. SEEBOLD.
BELT FASTENER.

No. 389,604. Patented Sept. 18, 1888.

Witnesses: Inventor:

(No Model.) 2 Sheets—Sheet 2.

M. SEEBOLD.
BELT FASTENER.

No. 389,604. Patented Sept. 18, 1888.

Witnesses: Inventor:

UNITED STATES PATENT OFFICE.

MORITZ SEEBOLD, OF BERLIN, GERMANY.

BELT-FASTENER.

SPECIFICATION forming part of Letters Patent No. 389,604, dated September 18, 1888.

Application filed February 23, 1888. Serial No. 264,877. (No model.)

*To all whom it may concern:*

Be it known that I, MORITZ SEEBOLD, a subject of the King of Prussia, German Emperor, residing at Berlin, in the Kingdom of Prussia, German Empire, engineer, have invented certain new and useful Improvements in Belt-Fasteners, of which the following is a complete specification.

The improved belt-fastener consists in two hooked catches or fasteners fastening in each other, capable of being moved to a limited angle on one side, as fully described in the following specification, and shown in the accompanying drawings.

Figure 1:
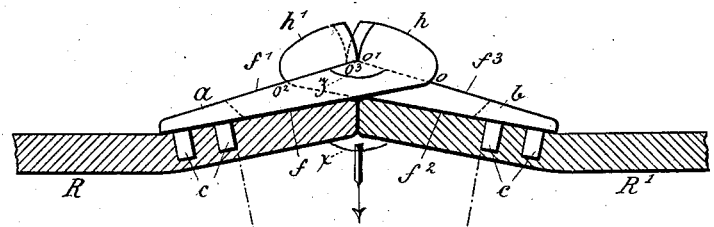
Figure 2:
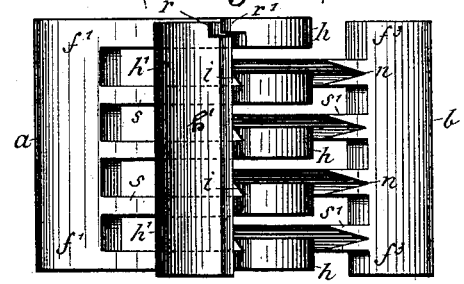
Figure 3:
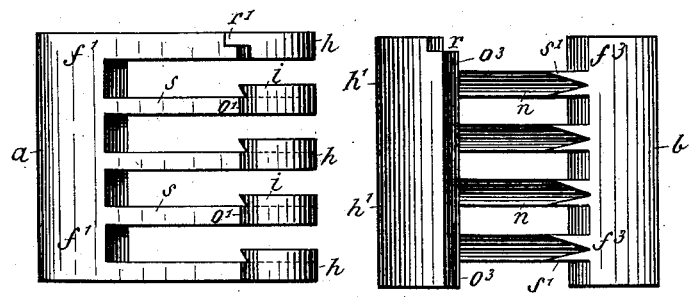
Figure 4:
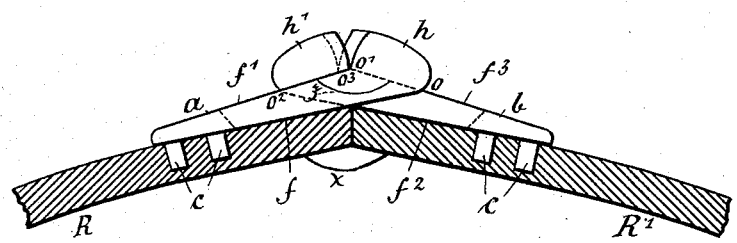
Figure 5:
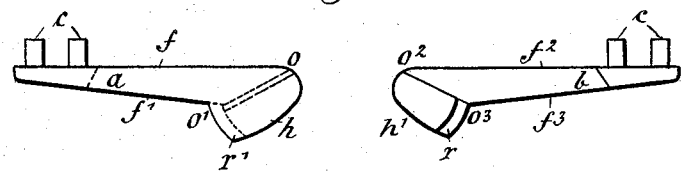
Figure 6:
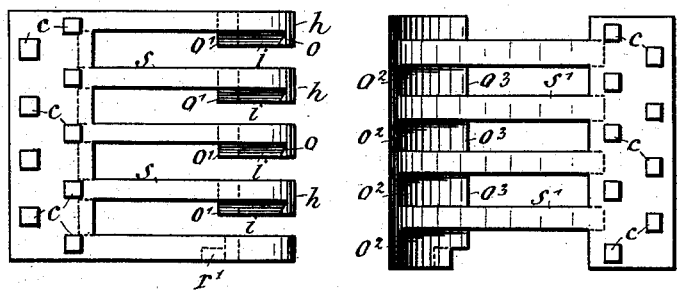

Figure 1 shows a view of the belt-fastener applied to a belt when running loose. Fig. 2 is a top view of the same. Fig. 3 shows the two halves separated. Fig. 4 shows a view of the belt-fastener applied to a belt when running round a pulley. Fig. 5 shows detail views of the same. Fig. 6 shows a view of the two halves of the belt-fastener from the under side.

By the improved fastener the disadvantage of the rivet heads or screws coming through is avoided, and, nevertheless, the loosening of the fastenings of the catches or fasteners is impossible, since the moving of the two halves of the belt-fastener on the belt itself, or on each other, is prevented, and the fastener when passing over a pulley adjusts itself to the diameter of the same. This is accomplished by the bounded movement of the hinged tongues in an outward direction. This bounded movement is obtained by the form of joints bearing surfaces (which regulate the amount the binders move) as hinges for the two halves of the fastener or binder. The contact points or surfaces must not lie in a straight line with each other, but at an angle, as seen in Figs. 1 to 6. $a\ b$ are the two halves of the belt fastener or binder, each being provided with projections $c\ c$, and the ends formed in a hooked manner, as shown at $h\ h'$. Both halves have one or more slits, which in the half $a$ extend right out to the end of $h$; but in the other half, $b$, they only reach to about a half of the length of the binder. The ribs $s\ s'$ are formed differently in each half. The rib $s$ is narrower than the head $h$, while $s'$ is made with the V-shaped furrow $n$ in it. The hook-formed head $h$ fasten in these furrows with their side projections, $i\ i'$. These projections $i\ i'$ are saw-like on their under sides, and so formed that the under side, $o\ o'$, lies on the upper side, $f^3$, of the half $b$. In the same manner the under surface, $o^2\ o^3$, of the hooked head $h'$ lies on the upper side, $f'''$, of the half $a$. These slant surfaces $o\ o'\ o^2\ o^3$ form the contact-surfaces between the two halves $a\ b$. Besides these is the small projection $r'$, which fastens into the recess $r$.

The jointing and working of this belt-fastener is as follows: Place half $b$ over the parts $h\ h$ of the half $a$. Fig. 3 shows the position of the fasteners before joining. The heads $h$ come through the slits in $b$, and when they project over the ribs $s'$ a slight sideward movement is given to the fastener $a$ and the belt stretched, so that the projection $r'$ comes into the recess at $r$, and the fastener assumes the position as shown in Figs. 1 and 2. An accidental unfastening of these fasteners $a\ b$, when they are fastened to the belt by means of the pins $c\ c$, is impossible, for the tension on the belt holds the heads $h\ h'$ against each other. The projection $r'$ prevents a side motion from $a$ toward $b$, as well as the parts $i\ i$, which fasten in the furrows $n\ n$. The belt-fastener when running in a straight line has the position as shown in Fig. 1.

Surface $f'$ lies fast against the surface $o^2\ o^3$ and $f^3$ against $o\ o'$. By means of the slanting surfaces $o\ o'$ and $o^2\ o^3$ the fasteners $a\ b$ are held securely together. They can only move in the one way, so that when the belt swings inward, as shown by the arrow $x$ in Fig. 1, no shock is conveyed to the fastenings, and consequently no loosening of the fastenings. At the same time if the belt swings outward the fasteners do not move together. As the surface $f'$ is at such an angle with $o^2\ o^3$ and $f^3$ with $o\ o'$, even the loosest belt would not swing so much as to make the angle $a$ smaller than $\beta$. If this is the case, the fastener $a$ oscillates toward $b$ in an outward direction round the center, and consequently the possibility of the loosening of the pins $c\ c$; but the new arrangement allows no oscillating of the belt-fastener in an outward direction, and no shock comes on the pins $c\ c$; but if the fastener runs over the pulley it may oscillate in an inward direction and so suit itself to every diameter. When running on the pulleys, the loosening of the fastener need not be feared.

It is clear that it is only necessary to hold the fasteners fast when running free between the pulleys, so that it cannot alter its position, and it is not necessary to place the fasteners $a\ b$ at a given angle, but they can also be placed in a straight line; but then the pins $c\ c$ must be placed at an angle to the fasteners.

What I claim, and desire to secure by Letters Patent in the United States, is—

1. In belt-fasteners, the combination of the heads $h\ h'$, provided with the bearing-surfaces $o\ o'\ o^2\ o^3$, hooks and side projections, $i\ i$, and also with ribs, the ribs of the one member having the furrows or grooves $n\ n$, all substantially as described.

2. A belt-fastener consisting of the member $a$, having ribs $s\ s$, provided with the heads $h\ h$, and side hooks, $i\ i$, in combination with the member $b$, having solid end portions and the intermediate ribs, $s'\ s'$, substantially as described.

In witness whereof I have hereunto set my hand in presence of two witnesses.

MORITZ SEEBOLD.

Witnesses:
O. MÜHLNER,
B. ROI.